US010385986B2

(12) United States Patent
Chang

(10) Patent No.: US 10,385,986 B2
(45) Date of Patent: Aug. 20, 2019

(54) VALVE CONTROL DEVICE

(71) Applicant: David Anthony Chang, Hong Kong (HK)

(72) Inventor: David Anthony Chang, Hong Kong (HK)

( * ) Notice: Subject to any disclaimer, the term of this patent is extended or adjusted under 35 U.S.C. 154(b) by 0 days.

(21) Appl. No.: 15/450,041

(22) Filed: Mar. 6, 2017

(65) Prior Publication Data

US 2017/0254434 A1 Sep. 7, 2017

Related U.S. Application Data

(60) Provisional application No. 62/304,308, filed on Mar. 6, 2016.

(51) Int. Cl.
F16K 31/04 (2006.01)
F16K 37/00 (2006.01)

(52) U.S. Cl.
CPC .......... *F16K 31/046* (2013.01); *F16K 31/042* (2013.01); *F16K 31/043* (2013.01); *F16K 37/0041* (2013.01)

(58) Field of Classification Search
CPC .... F16K 31/042; F16K 31/046; F16K 31/043; F16K 37/0041
USPC ......................................................... 137/554
See application file for complete search history.

(56) References Cited

U.S. PATENT DOCUMENTS

| | | | | |
|---|---|---|---|---|
| 2,760,036 A * | 8/1956 | Raymer | ................... | H01C 1/12 191/1 R |
| 3,597,837 A * | 8/1971 | Mack | ..................... | H01C 10/32 264/157 |
| 4,724,286 A * | 2/1988 | Cummins | ............ | H01H 3/0213 200/11 R |
| 5,002,032 A * | 3/1991 | Kolberg | ................ | F02D 11/107 123/361 |
| 6,408,901 B2 * | 6/2002 | Holloway | ............. | F16K 31/047 141/301 |
| 6,708,083 B2 * | 3/2004 | Orthlieb | ............ | G05D 23/1934 236/46 R |
| 8,887,655 B2 * | 11/2014 | Carlson | ................... | F16K 31/44 116/277 |
| 2003/0182809 A1 * | 10/2003 | Enzinna | .................... | G01D 5/04 33/1 PT |
| 2005/0218311 A1 * | 10/2005 | Campany | .............. | F16K 31/042 250/231.13 |
| 2013/0049644 A1 * | 2/2013 | Neumann | ........... | F24F 13/1426 318/15 |
| 2015/0122134 A1 * | 5/2015 | Moro | ..................... | F23N 1/007 99/332 |

FOREIGN PATENT DOCUMENTS

| CN | 201428855 Y | 3/2010 |
|---|---|---|
| CN | 104487772 A | 4/2015 |

* cited by examiner

*Primary Examiner* — Angelisa L. Hicks

(57) ABSTRACT

A valve control device includes a housing provided with a control shaft, a motor for driving the control shaft to rotate, a control circuit board connected to the motor, and a sensor for detecting a rotational position of the control shaft. The sensor is connected to the control circuit board, which controls the motor to drive the control shaft to rotate in response to a position signal returned by the sensor. The valve control device may further include a position pointer, an indicating light, or a buzzer to facilitate observation of the opening and closing position of the valve.

8 Claims, 8 Drawing Sheets

VALVE CONTROL DEVICE

CROSS-REFERENCE TO RELATED APPLICATIONS

This application claims the benefit of U.S. Provisional Patent Application No. 62/304,308, filed Mar. 6, 2016, the entire content of which is hereby incorporated by reference.

FIELD OF THE TECHNOLOGY

The present application relates to valve control devices and, more particularly, to a valve control device which is suitable for accurate control of flow and position requirements for valve switch positions, high demand for switch position accuracy, positioning accuracy, visualization and automation level.

BACKGROUND

Existing valve control device, e.g. valve control device suitable for a PE24 valve, is equipped with a mechanical touch switch to control mechanical rotation of a valve so as to control the opening, stopping position and direction of rotation of the valve, adjust the valve opening and closing direction, and achieve the role of controlling the change water flow. The product has been widely used in the control of water use with frequent adjustment in family swimming pools and spa clubs, etc.

The touch switch of the valve control device is connected with the motor power supply. The touch switch is fixed on both sides of the rotary shaft of the valve. The rotary shaft of the valve is provided with the cam which can touch the touch switch on both sides. Two-way rotational direction of the motor can be controlled by switching an external power supply so as to realize the opening and closing of the valve body.

The position of the valve is controlled by the cam pressing against the touch switch on both sides on the rotating shaft of the valve. Due to the design principle of the product and the limitation of the manufacturing process, such as the touch switch as a standard part, each product has the same arm length (equidistant) contact, and the contact distance cannot be adjusted according to actual need. The cam of the control shaft cooperating with the touch switch is fixed on the control shaft formed by molding, and then fixed on the housing of the valve control device by screws. The position of the product after completion of assembly is basically not adjustable.

According to the existing products in the production process and practical application, due to the above mechanical control mode has a large matching deviation, the product in the production process is difficult to adjust and reset. Due to the deviation of the control signal of the touch switch, and the characteristics of 360-degree rotation of the valve core, the valve core is not synchronized with the control shaft. It is not possible to directly observe the position of the valve core, and cannot actually know whether the valve is properly closed. This results in difficulties in adjusting and testing during product manufacturing process. A user cannot adjust and reset the product after it is out of the factory. The result is that the closing of the valve is not tight, and the usage and water leakage issues are difficult to solve.

SUMMARY

In an aspect, there is provided a valve control device including:

a housing;
a control shaft provided in the housing;
a motor for driving the control shaft to rotate;
a control circuit board connected to the motor; and
a sensor for detecting a rotational position of the control shaft, the sensor being connected to the control circuit board, the control circuit board controlling rotation of the motor according to a position signal returned by the sensor so as to drive the control shaft to rotate;
wherein the sensor comprises a position signal generating device having a positioner paddling plate and a position-following plate, the positioner paddling plate being rotatable synchronously with the control shaft, and connected with the control circuit board, the position-following plate being secured within the housing, the control shaft passing through the position-following plate, the positioner paddling plate being in contact with the position-following plate, the position signal generating device having the position-following plate and the positioner paddling plate being connected to the control circuit board, and when the control shaft rotates, the position-following plate outputs a position signal corresponding to the rotational position of the control shaft.

The housing may be provided therein with a middle splint, the position-following plate being secured on the middle splint, the position-following plate having a through-hole through which the control shaft passes, a cam being fixedly sleeved onto the control shaft and rotatable synchronously with the control shaft, and the positioner paddling plate being fixed on the cam and rotatable synchronously with the control shaft. The position-following plate may be a resistor.

The sensor may be a potentiometer, the potentiometer having an input shaft, a set of transmitting gears being provided between the control shaft and the input shaft, wherein the set of transmitting gears comprises at least a driving gear mounted on the control shaft and a driven gear mounted on the input shaft, and when the control shaft rotates, the potentiometer outputs a position signal that corresponds to the rotational position of the control shaft.

The housing may be provided therein with a middle splint, the potentiometer being fixed on the middle splint, the middle splint being further provided with a driving gear support, the driving gear being located on the driving gear support.

An upper end of the control shaft may penetrate an upper portion of the housing, and an outer surface of the upper portion of the housing may be provided with a dial gauge surrounding the upper end of the control shaft, the upper end of the control shaft being provided with a position pointer which is rotatable synchronously with the control shaft, the position pointer cooperates with the dial gauge and is synchronized with the control shaft and the valve to thereby indicate opening and closing condition of the valve.

An upper end of the control shaft may penetrate an upper portion of the housing, and a manual knob is provided at the upper end of the control shaft.

The valve control device may further include an indicating light connected to the control circuit board for indicating adjusting, testing and operating state of the valve.

The valve control device may further include a buzzer connected to the control circuit board for indicating adjustment, test and operation of the valve.

In another aspect, there is also provided a valve control device including a housing, a control shaft provided in the housing, a motor for driving the control shaft to rotate, and a control circuit board connected to the motor, characterized by further comprising a sensor for detecting a rotational position of the control shaft, the sensor being connected to the control circuit board, the control circuit board controlling rotation of the motor according to a position signal returned by the sensor so as to drive the control shaft to rotate.

The sensor may include a position signal generating device having a positioner paddling plate and a position-following plate, the positioner paddling plate being rotatable synchronously with the control shaft, and connected with the control circuit board, the position-following plate being secured within the housing, the control shaft passing through the position-following plate, the positioner paddling plate being in contact with the position-following plate, the position signal generating device having the position-following plate and the positioner paddling plate being connected to the control circuit board, and when the control shaft rotates, the position-following plate outputs a position signal corresponding to the rotational position of the control shaft.

The housing may be provided therein with a middle splint, the position-following plate being secured on the middle splint, the position-following plate having a through-hole through which the control shaft passes, a cam being fixedly sleeved onto the control shaft and rotatable synchronously with the control shaft, and the positioner paddling plate being fixed on the cam and rotatable synchronously with the control shaft. The position-following plate may be a resistor.

The sensor may be a potentiometer, the potentiometer having an input shaft, a set of transmitting gears being provided between the control shaft and the input shaft, wherein the set of transmitting gears comprises at least a driving gear mounted on the control shaft and a driven gear mounted on the input shaft, and when the control shaft rotates, the potentiometer outputs a position signal that corresponds to the rotational position of the control shaft.

The housing may be provided therein with a middle splint, the potentiometer being fixed on the middle splint, the middle splint being further provided with a driving gear support, the driving gear being located on the driving gear support.

An upper end of the control shaft may penetrate an upper portion of the housing, and an outer surface of the upper portion of the housing is provided with a dial gauge surrounding the upper end of the control shaft, the upper end of the control shaft being provided with a position pointer which is rotatable synchronously with the control shaft, the position pointer cooperates with the dial gauge and is synchronized with the control shaft and the valve to thereby indicate opening and closing condition of the valve.

An upper end of the control shaft may penetrate an upper portion of the housing, and a manual knob is provided at the upper end of the control shaft.

The valve control device may further include an indicating light connected to the control circuit board for indicating adjusting, testing and operating state of the valve.

The valve control device may further include a buzzer connected to the control circuit board for indicating adjustment, test and operation of the valve.

BRIEF DESCRIPTION OF THE DRAWINGS

The valve control device of the present application will now be further described with reference to the accompanying drawings in which.

DETAILED DESCRIPTION

Figure 1:
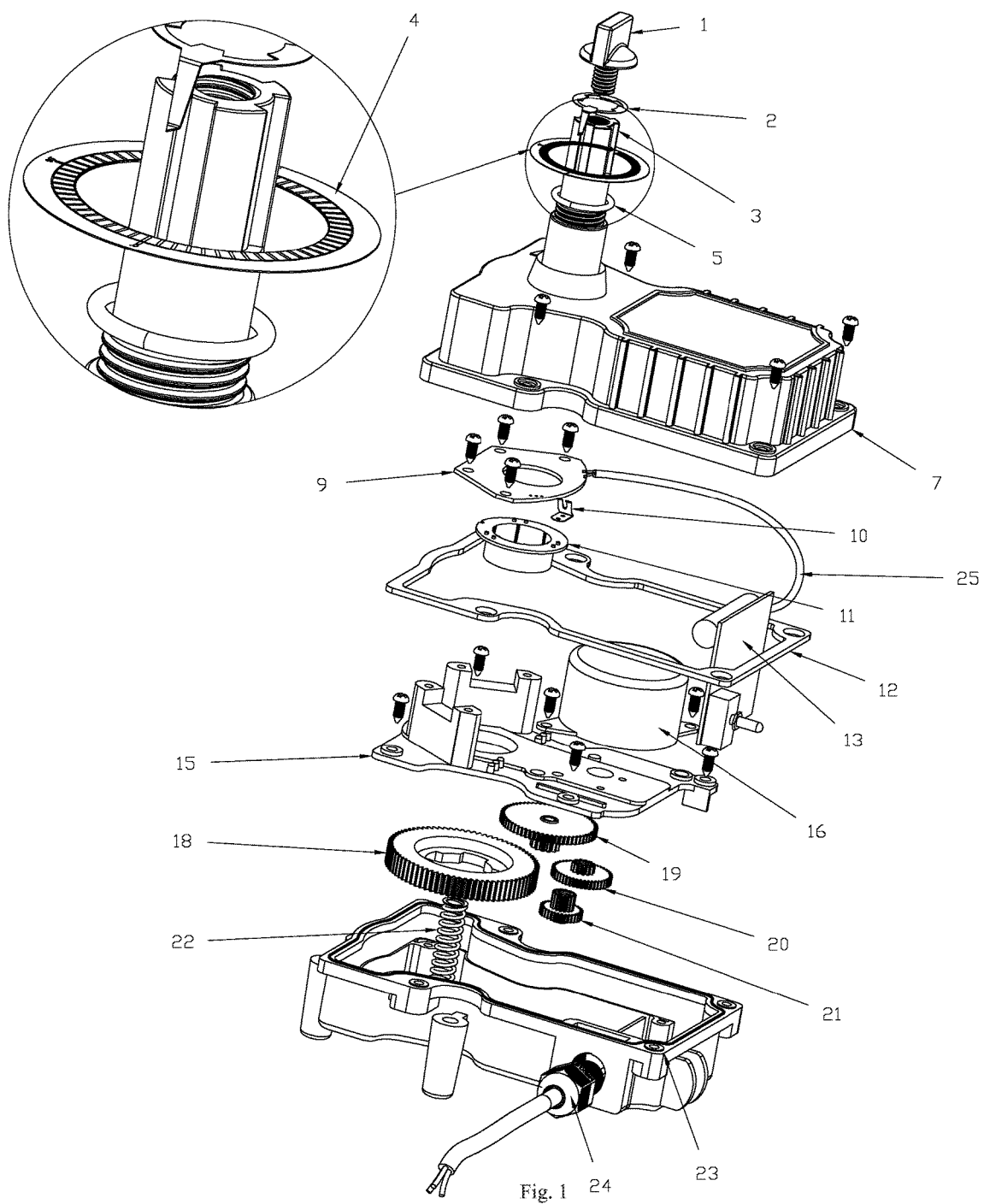
FIG. 1 is an exploded view of a first embodiment of the valve control device of the present application.

For a clear understanding of the technical features, objects and effects of the valve control device of the present application, specific embodiments of the valve control device will now be described in detail with reference to the accompanying drawings.

Embodiments of the valve control device of the present application are described in detail below, examples of which are shown in the accompanying drawings, wherein like or similar reference numerals refer to like or similar elements or elements having the same or similar functions.

It should be appreciated that in the description of the valve control device of the present application, the terms "front", "rear", "upper", "lower", "upper end", "lower end", "upper portion", "lower portion", etc. refer to the orientation or position of a structure as it is oriented and positioned in the drawings. Those terms are used to simplify the description and do not indicate or imply that the structure must have a specific orientation or operate in a specific position. Those terms should not be considered as limiting. As used herein, the terms "first", and "second" etc. are merely used to differentiate features to be described, and are not meant to indicate or imply the relative importance of the features.

Figure 2:
FIG. 2 is a schematic diagram of the principle of the control of the valve control device of the present application.
Figure 3:
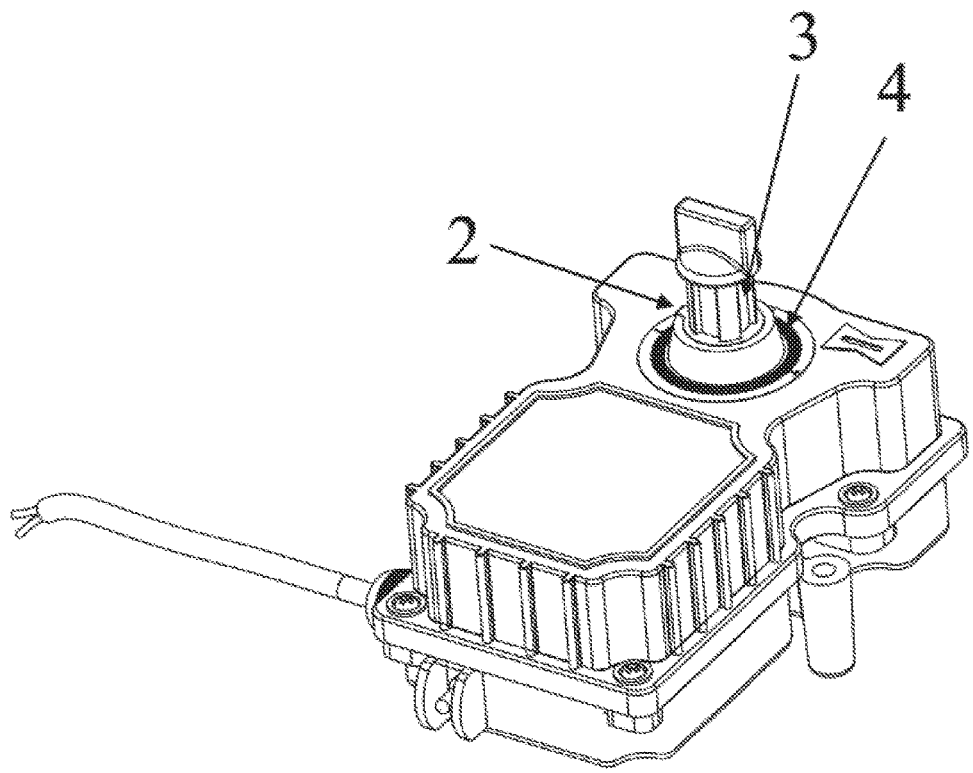
FIG. 3 is a perspective view of a first embodiment of the valve control device of the present application.
Figure 4:
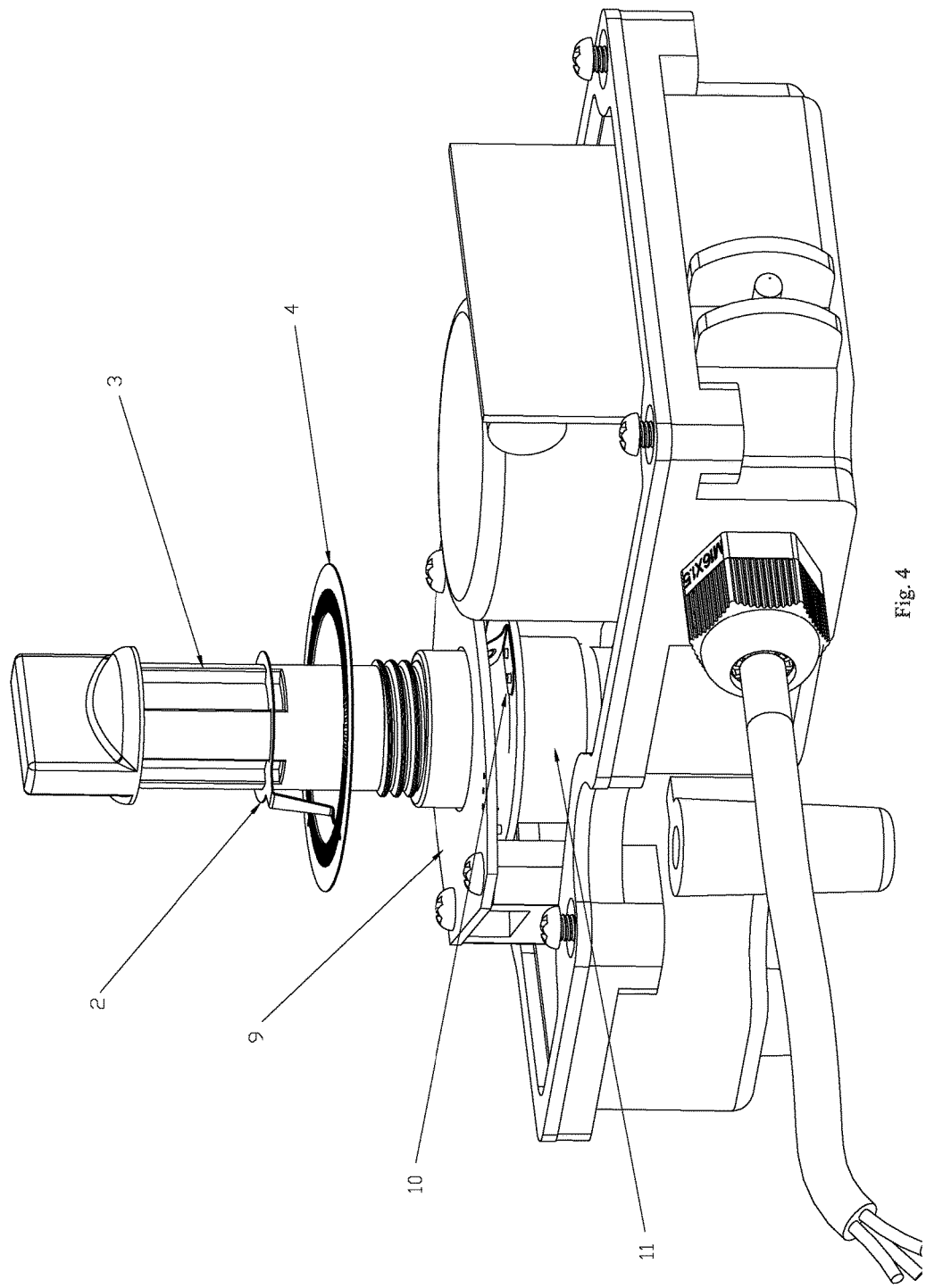
FIG. 4 is a perspective view of the structure of a first embodiment of the valve control device of the present application.

FIGS. 1, 3 and 4 show a first embodiment of the valve control device of the present application. The valve control device may include a housing 7, 23. In the present embodiment, the housing may include an upper housing 7 and a lower housing 23. The upper housing 7 and the lower housing 23 can form a space for receiving therein the components of the valve control device. The housing 7, 23 may be provided therein with a control shaft 3 for driving a valve core of a valve to rotate synchronously therewith. The control shaft 3 may be rotatably driven by a motor 16 so as to drive the valve core of the valve to rotate. The motor 16 may be connected to a control circuit board 13, and can be rotated under the control of the control circuit board 13. In order to be able to precisely control the rotational position of the control shaft 3, the valve control device of the present application may further include a sensor for detecting the rotational position of the control shaft 3. The sensor may be connected to the control circuit board 13. The control circuit board 13 can control the rotation of the motor 16 according to position signals returned from the sensor so as to drive the control shaft 13 to rotate to a desired position. The principle of the control of the valve control device is shown in FIG. 2.

In the present embodiment shown in FIGS. 1 and 4, the sensor may include a position signal generating device having a positioner paddling plate 10 and a position-following plate 9. The positioner paddling plate 10 may be rotatable synchronously with the control shaft 3, and may be connected to the control circuit board 13. The position-following plate 9 may be fixed in the housing. The position signal generating device having of the position-following plate 9 and the positioner paddling plate 10 may be connected to the control circuit board 13. The control shaft 3 may penetrate the position-following plate 9. The positioner paddling plate 10 may be in sliding contact with the position-following plate 9 along a circular path thereon. The position-following plate 9 may be connected to the control circuit board 13 through a wire 25. When the control shaft 3 rotates, the position-following plate 9 outputs a position signal that corresponds to the rotational position of the control shaft 3. The position signal can be an electrical signal, whose value may be variable and correspond to the rotational position of the control shaft 3. Hence, the control circuit board 13 can determine the position of the control shaft 3 on the basis of the position signal, thereby controlling the motor 16 to rotate the control shaft 3 to a desired position. In the present embodiment, the housing may be provided therein with a middle splint 15. The position-following plate 9 may be fixed on the middle splint 15. The position-following plate may be formed with a through-hole through which the control shaft 3 can pass. The control shaft 3 may be sleeved thereon with a cam 11, which can be rotatable synchronously with the control shaft 3. The positioner paddling plate 10 may be fixed on an edge of the cam 11.

When the control shaft 3 rotates, the positioner paddling plate 10 can slidably contact the position-following plate 9 along a circular path thereon and output a variable electrical parameter value signal that corresponds to the rotational position of the control shaft 3. The electrical signal may be transmitted to the control circuit board 13 via the wire 25 so that processing such as storing the electrical signal can be carried out. The control circuit board 13 can then control the motor 16 according to the result of the processing. The motor 16 can drive the control shaft 3 to rotate, and in turn drive the valve core of the valve to rotate in order to control the opening and closing of the valve. The position-following plate 9 may be a resistor, such as a double ring resistor. When the control shaft 3 is rotated by the driving of the motor 16, the positioner paddling plate 10, which is rotated synchronously with the control shaft 3, can be in sliding contact with the position-following plate 9 along a circular path thereon. An electrical signal of a different position can be obtained from the double ring resistor. The electrical signal obtained from the double ring resistor can be transmitted to the control circuit board 13 through the wire 25 in real time, and the control circuit board 13 can then store the electrical signal.

In the present embodiment, the motor 16 and the control shaft 3 can be driven by a set of transmitting gears, which may include a driving gear 21 sleeved onto an output shaft of the motor 16, a first transmitting gear 20 meshing with the driving gear 21, a second transmitting gear 19 meshing with the first transmitting gear 20, and an output gear 18 meshing with the second transmitting gear 19. The output gear 18 may be sleeved onto the control shaft 3, and rotatable synchronously with the control shaft 3.

In the present embodiment shown in FIGS. 1 and 4, the upper end of the control shaft 3 may penetrate an upper portion of the upper housing 7 in order to facilitate the observation of the rotational position of the control shaft 3. The outer surface of the upper portion of the upper housing 7 may be provided with a dial gauge 4 surrounding the upper end of the control shaft 3. The dial gauge 4 can be a dial gauge or a scale directly marked on the upper housing 7. The upper end of the control shaft 3 may be provided with a position pointer 2 which may be rotatable synchronously with the control shaft 3. The position pointer 2 may cooperate with the dial gauge 4 to indicate the opening and closing of the valve. The position indication of the position pointer 2 can correspond synchronously with the electrical signal generated by the position-following plate 9.

The electric signal of the control circuit board 13 may have a value that can be one-to-one corresponding to the dial gauge 4 fixed on the upper housing 7 at the position indicated by the positional pointer 2 synchronously fixedly connected to the control shaft 3. That is, following the change of the rotational position of the control shaft 3, a corresponding electrical signal value can be generated on the position-following plate 9, and transmitted to the control circuit board 13 via the wire 25 so as to control the motor 16 to drive the control shaft 3 to rotate or stop, and finally to achieve the control of the opening and closing position of the valve core through visual observation of the indicating position of the position pointer 2.

The position pointer 2, the control shaft 3, the cam 11, and the positioner paddling plate 10 fixed on the cam 11 may form a rotary shaft which may be rotatably synchronously, and the position of the control shaft 3 may be displayed in real time through the position pointer 2 at the dial gauge 4. The upper end of the control shaft 3 may be fixedly connected with a manual knob 1, the control shaft 3 may be manually opened and closed by the manual knob 1 when it is out of electricity.

Referring to FIG. 1, the manual knob 1 may be in a threaded form from top to bottom so as to close and fix the top end of the control shaft 3, and prevent displacement of the elements fixed on the control shaft 3, e.g. the position pointer 2, due to rotation of the control shaft 3, which may cause malfunction. A rectangular housing gasket 12 may be mounted and fixed between the upper housing 7 and the lower housing 23 to effect a waterproof seal. A waterproof joint 24 may be provided with a built-in input power cord to supply input power to the control unit.

As shown in FIGS. 1 and 4, the position pointer 2 may be integrated with the control shaft 3 by means of penetration through a hole, and may be movable synchronously with the control shaft 3. The dial gauge 4 fixed on the upper housing 7 and the position pointer 2 may form a pointer-type dial gauge, which may be synchronized with the valve core of the valve. It is not necessary to disassemble the housing. By only observing the position indicated by the position pointer 2 on the dial gauge 4, the position of the valve core in the valve body can be viewed in real time so as to determine adjustment and closing condition of the valve core.

The control shaft 3 can be a key element that passes through the entire product. Referring to FIG. 4, the rotary shaft may be formed by an O-ring 5, a fixing hole on the upper housing 7, the middle splint 15, the output gear 18, the lower housing 23 and the required fastening screws. The position-following plate 9 may be fixed on two pillars on the middle splint 15 by four screws. The motor 16 may be fixed on the middle splint 15. The output shaft of the motor 16, passing through a hole on the middle splint 15, may be connected to the driving gear 21 fixed on the lower housing 23. The first transmitting gear 20 may mesh with the driving gear 21, the second transmitting gear 19 may mesh with the first transmitting gear 20, the output gear 18 may mesh with the second transmitting gear 19. The output gear 18 may be sleeved onto the control shaft 3, and rotate synchronously with the control shaft 3. Spring 22 may be provided to support the output gear 18.

Figure 6:
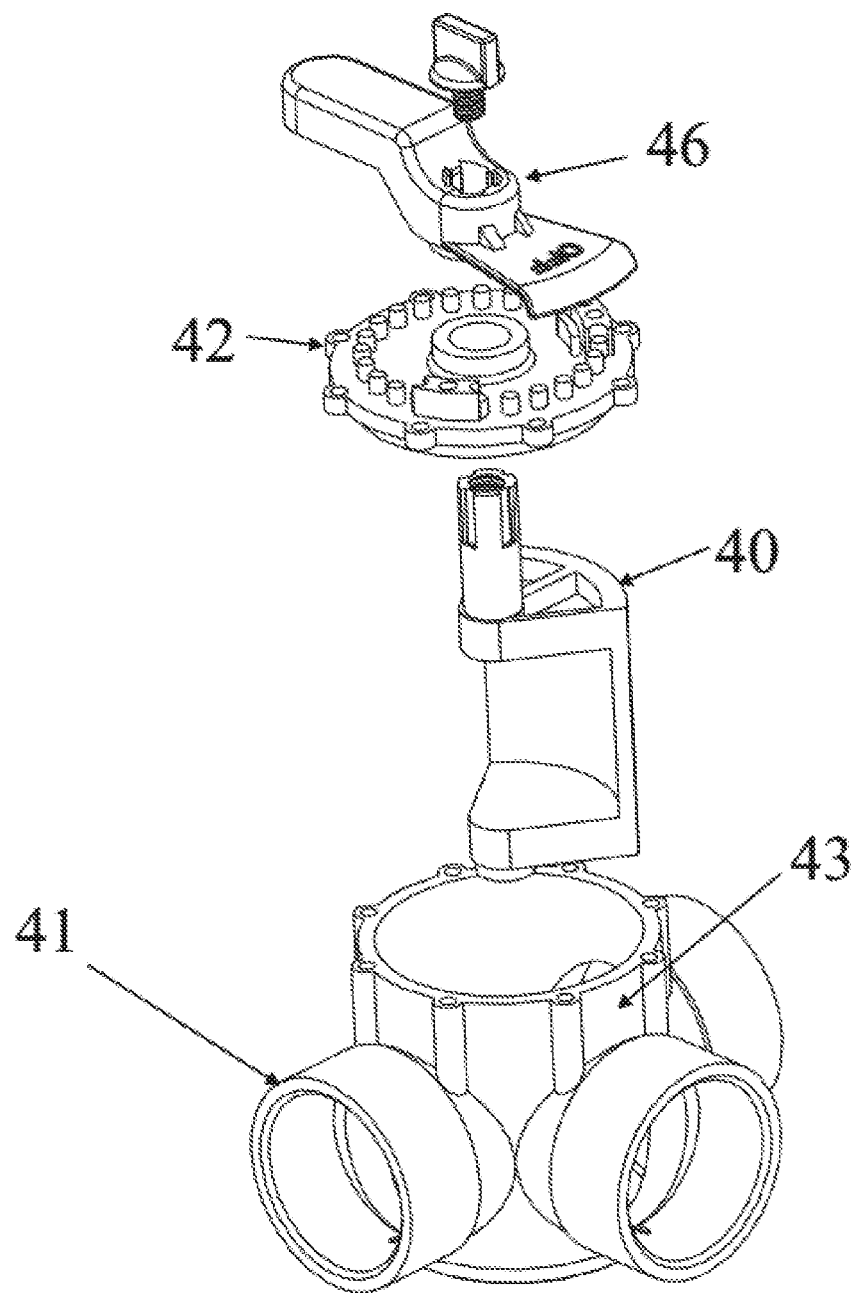
FIG. 6 is an exploded view of a three-way valve.

Referring to FIG. 6, a manual handle 46 may be manually operable to control the opening and closing of the valve when it is out of electricity or when manual opening and closing mode is selected. The position at which the manual handle 46 is connected to the fixing hole may match the upper end of the control shaft 3 of the valve control device shown in FIG. 1, and may match with a connecting upper end of the valve core 40 of the valve. The manual handle 46 can be used in two different control positions. Valve port 41 may be a water inlet of the valve, and may be oriented opposite to the direction of a water inlet at 180 degrees with the same diameter. For a three-way valve, inlet opening and closing can be controlled through the position of the valve core 40.

Referring to FIGS. 1 and 4, the electrodes of the positioner paddling plate 10 and the position-following plate 9 can be electrically connected, and rotatable synchronously with the control shaft 3 so as to obtain a synchronously changed electrical signal. The position-following plate 9 may be connected to the control circuit board 13 via the wire 25. The control circuit board 13 may be fixed on the lower housing 23. The electrical signal may be stored and processed in order to control the motor 16 to operate or stop, and rotation direction can be controlled. The positioner paddling plate 10 may be electrically connected to the two resistor rings (double ring resistor) on the position-following plate 9 to form a variable resistor which varies with the change in the angle of rotation of the control shaft 3, and can pass the electrical signal to the control circuit board 13 via the wire 25 for storage processing. The control circuit board 13 can control the motor 16 to start or stop rotation in both directions. The power supply can control the motor 16 to supply power to the valve switch through the control circuit board 13.

Figure 5:
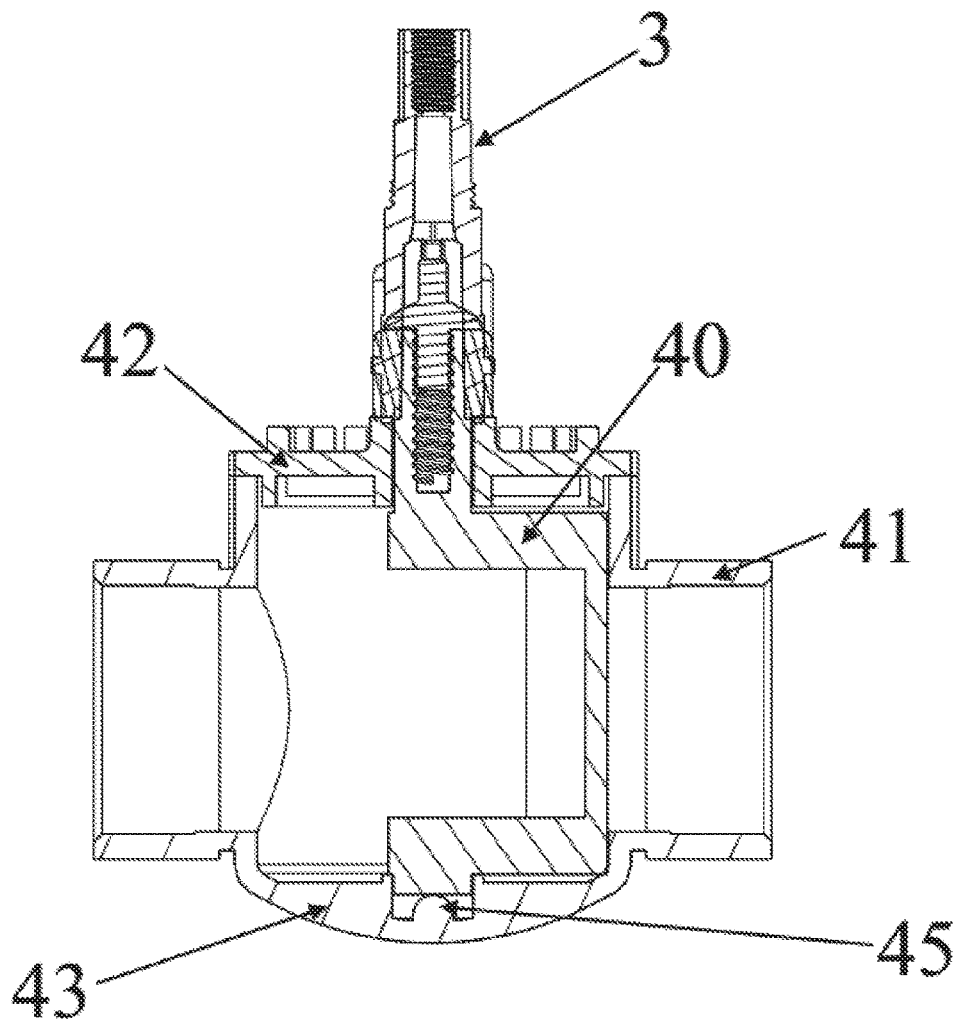
FIG. 5 is a cross sectional view of the coupling of a two-way valve with a control shaft of the valve control device of the present application.

As shown in FIGS. 5 and 6, the control shaft 3 may be fixed with the sleeve of the valve core 40 of the valve body 43, and drive the valve core 40 to rotate to open and close the valve port 41 in order to effect the control of water flow. Valve cover 42 of the valve can fix the valve core 40 in the valve body 43. The valve core 40 in the valve body 43 can rotate with a valve core rotating point 45 as a rotation axis so as to control the opening and closing of the valve.

As described above, in the present application, the position pointer 2 may be rotatable synchronously with the positioner paddling plate 10 and the valve core 40 about the same axis. The position of the internal valve core 40 may be determined by direct observation of the position pointer 2 at the dial gauge 4. Electrical signals of different values may be obtained by paddling of the positioner paddling plate 10 on the position-following plate, and transmitted to the control circuit board 13 for processing to thereby control the motor 16 in order to solve the problem of precisely controlling the opening and closing of the valve and its operating position.

Figure 7:
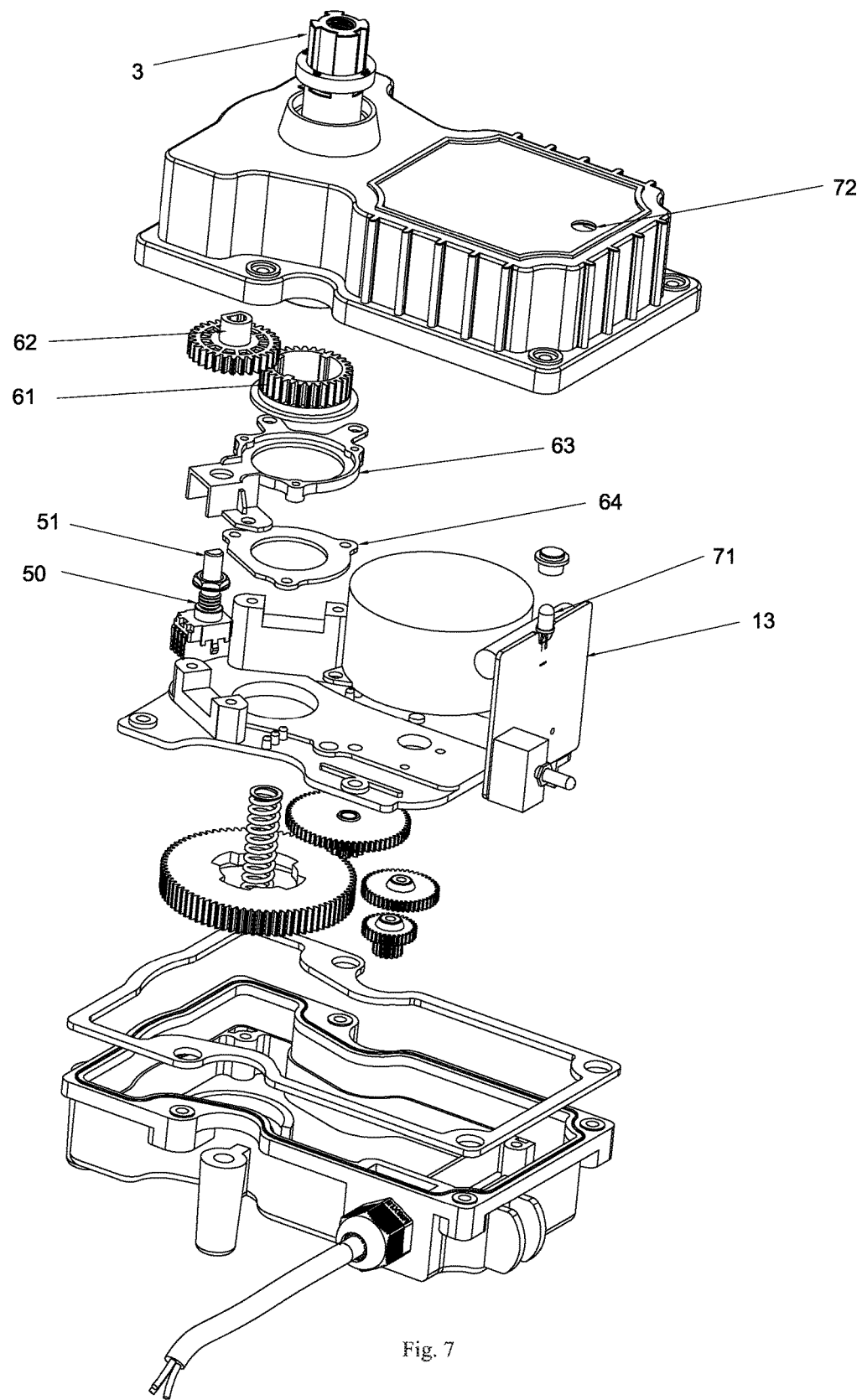
FIG. 7 is an exploded view of a second embodiment of the valve control device of the present application.
Figure 8:
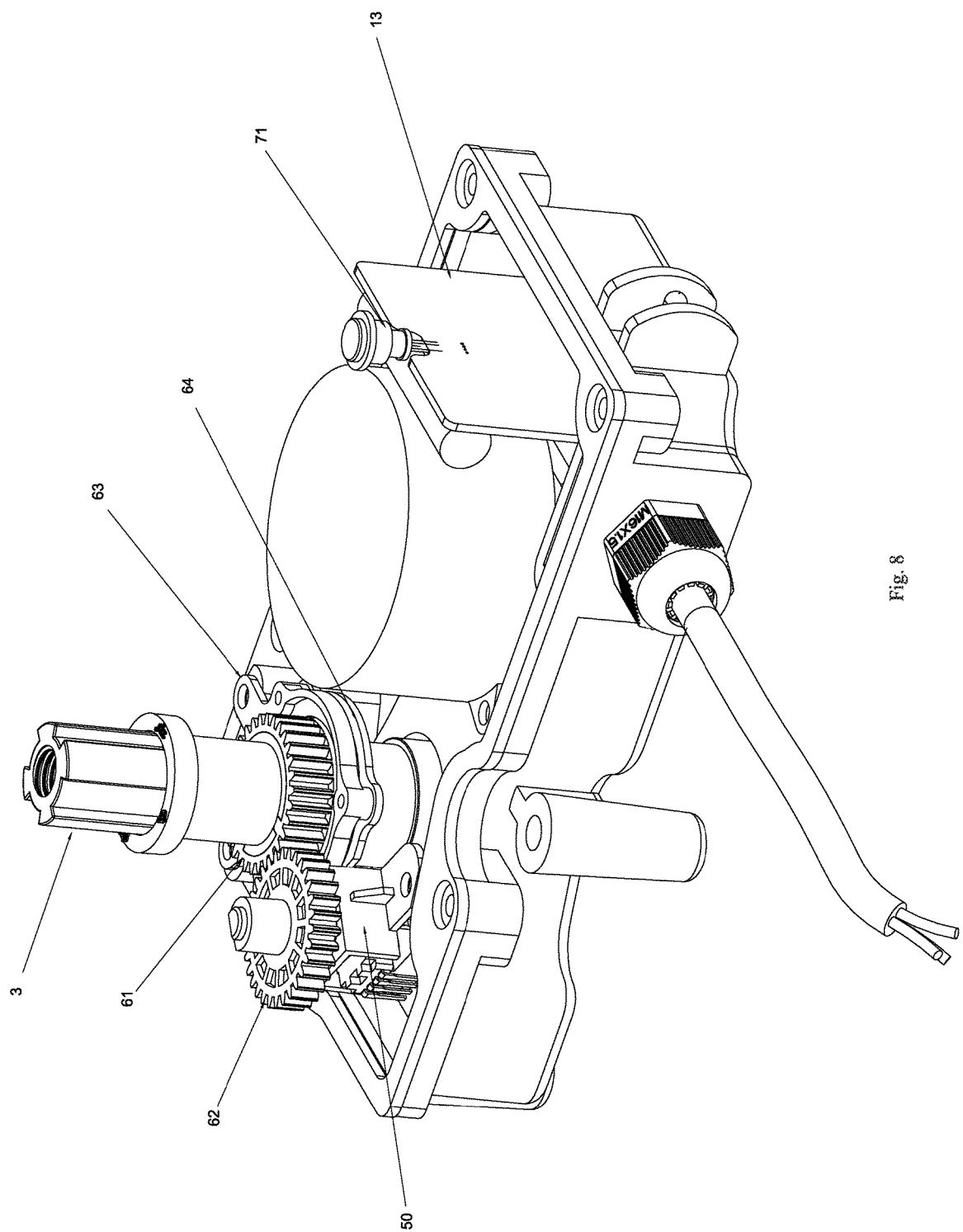
FIG. 8 is a perspective view of the structure of the second embodiment of the valve control device of the present application.
Figure 9:
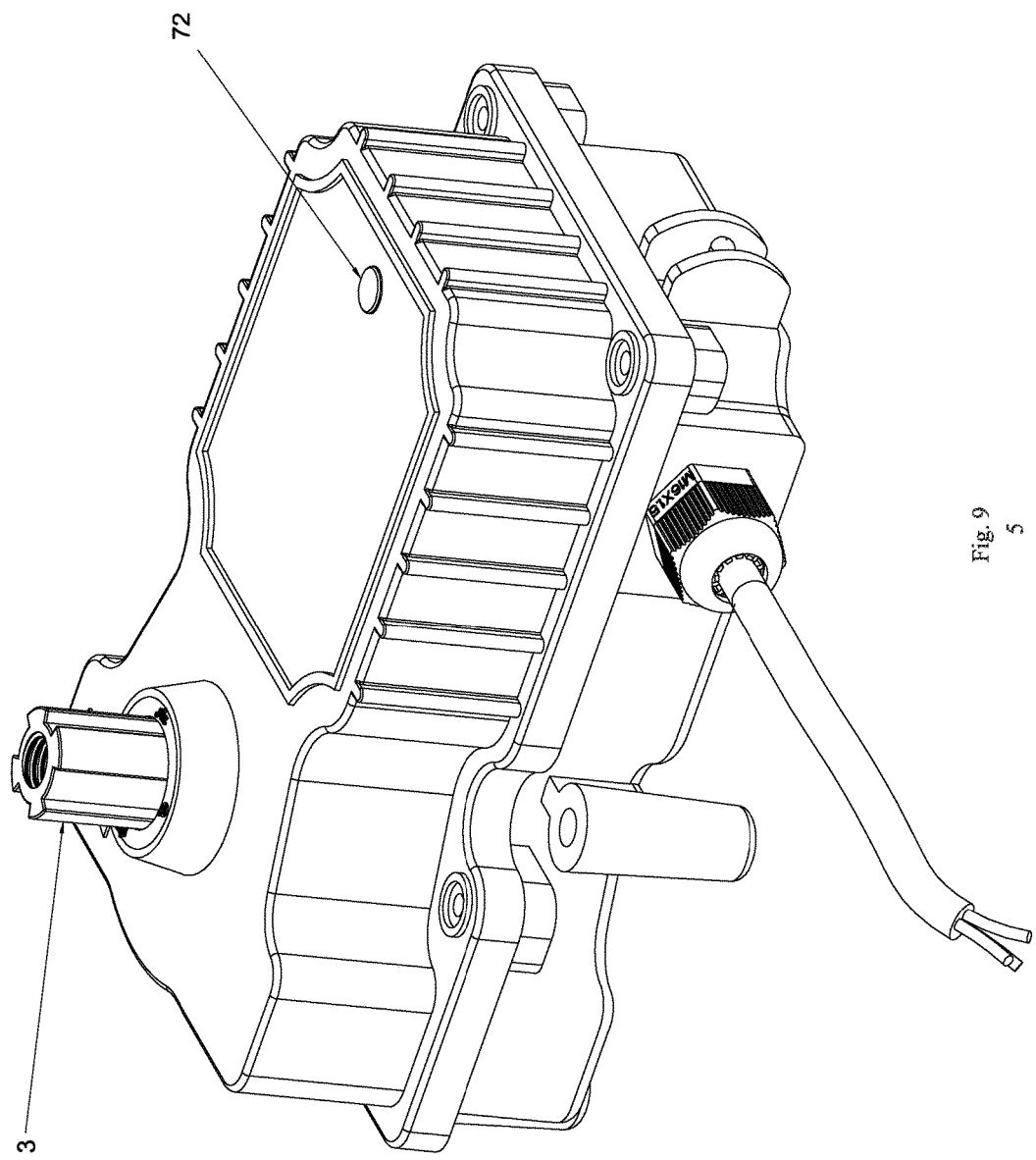
FIG. 9 is a perspective view of the second embodiment of the valve control device of the present application.

FIGS. 7 to 9 show the valve control device according to a second embodiment of the present application. The valve control device of this second embodiment is modified on the basis of the first embodiment. The sensor of the valve control device of the second embodiment is different from the sensor of the valve control device of first embodiment. In the present embodiment, the sensor may be a potentiometer 50 having an input shaft 51. A set of transmitting gears may be provided between the control shaft 3 and the input shaft 51. The set of transmitting gears may include at least a driving gear 61 sleeved onto the control shaft 3, and a driven gear 62 sleeved onto the input shaft 51. When the control shaft 30 rotates, the potentiometer 50 may output a position signal corresponding to the rotational position of the control shaft 3. In the present embodiment, the rotational position information of the control shaft 3 may be transmitted to the potentiometer 50 through the driving gear 61, the driven gear 62, and the input shaft 51. The potentiometer 50 can return the position information to the control circuit board 13. The control circuit board 13 can control the rotation of the motor shaft based on the position information, thereby driving the control shaft 13 to the desired position. Thereafter, power portion can realize adjustment and control of water flow condition of the valve through the rotation of the valve core 40 connected to the control shaft 13. The rotational position information of the control shaft 3 can complete loop feedback control by recycling through the driving gear 61, the driven gear 62, the potentiometer 50, and the control circuit board 13.

The second embodiment of the valve control apparatus of the present application may be based on the first embodiment of the valve control apparatus of the present application. The rotational position information of the control shaft 3 may be transmitted by the meshing driving gear 61 and driven gear 62 to the potentiometer 50. The potentiometer 50 may convert spatial position information into electrical signal, and may then perform precise control of the rotational position of the control shaft 3 in accordance with the control principle shown in FIG. 2, thereby achieving precise control of the opening and closing of the valve.

The valve control device of the second embodiment may be different from the valve control device of the first embodiment in that, as shown in FIG. 7, the control shaft 3 may pass through the driving gear 61, driving gear support 63, driving gear fixing plate 64, middle splint 15, driven gear 62, and lower housing 23, and connect to valve core 40 to form a main actuating element of the valve control device. The driving gear support 63 and the driving gear fixing plate 64 may fix the driving gear 61 on the middle splint 15 to prevent the driving gear 63 from being displaced, and the control shaft 13 can be stably connected to the driving gear 61 and the driven gear 62.

The difference between the second embodiment of the valve control device and the valve position control device of the first embodiment in obtaining the rotational position information of the control shaft 3 is that the control shaft 3 may be closely connected to the driving gear 61. When the control shaft 3 is driven to rotate by the motor 16, the control shaft 3 drives the valve core 40 to rotate to achieve opening and closing of the valve. The control shaft 3 may transmit the rotational position information synchronously to the driven gear 62 through the driving gear 61. The driven gear 62 may convert spatial position to electrical signal, and transmit to the control circuit board 13 through a coaxially connected potentiometer shaft so as to effect control of the valve.

As shown in FIG. 8, the valve control device of the present embodiment may further include an indicating light 71. The indicating light 71 may be connected to the control circuit board 13, and may perform adjustment and testing, and real time display of the operating condition through the control of the control circuit board 13. An operator can observe in real time the operation, adjusting and testing condition of the valve through observation window 72, and can perform direct control, adjustment and test of the valve through observation indicator 71. In addition, the valve control device of this embodiment may include an electronic buzzer integrated with the control circuit board 13, which may be synchronized with the indicating light 71 through the control circuit board 13. Through sound and vision, one can simultaneously observe the operation, adjusting and testing condition of the valve.

Specific embodiments have been described above with reference to the accompanying drawings. However, the present application is not limited to the above specific embodiments. The above specific embodiments are merely illustrative and should not be considered as limiting. It should be noted that, upon reading the above disclosure, a person skilled in the art can make various other changes or modifications without departing from the scope of the appended claims.

What is claimed is:

1. A valve control device comprising:
   a housing;
   a control shaft provided in the housing;
   a motor for driving the control shaft to rotate;
   a control circuit board connected to the motor; and
   a sensor for detecting a rotational position of the control shaft, the sensor being connected to the control circuit board, the control circuit board controlling rotation of the motor according to a position signal returned by the sensor so as to drive the control shaft to rotate;
   wherein the sensor comprises a position signal generating device having a positioner paddling plate and a position-following plate, the positioner paddling plate being rotatable synchronously with the control shaft, and connected with the control circuit board, the position-following plate being secured within the housing, the control shaft passing through the position-following plate, the positioner paddling plate being in sliding contact with the position-following plate along a circular path thereon, the position signal generating device having the position-following plate and the positioner paddling plate being connected to the control circuit board, and when the control shaft rotates, the position-following plate outputs a position signal corresponding to the rotational position of the control shaft;
   wherein a cam is fixedly sleeved onto the control shaft and rotatable synchronously with the control shaft, and the positioner paddling plate being fixed on the cam and rotatable synchronously with the control shaft
   wherein the position-following plate is a double ring resistor, and
   the positioned paddling plate is an L-shaped plate having a horizontal leg being fixed on an edge of the cam, and a vertical leg having two forks being in sliding contact with the double ring resistor.

2. The valve control device as claimed in claim 1, wherein the housing is provided therein with a middle splint, the position-following plate being secured on the middle splint, the position-following plate having a through-hole through which the control shaft passes.

3. The valve control device as claimed in claim 1, wherein the sensor is a potentiometer, the potentiometer having an input shaft, a set of transmitting gears being provided between the control shaft and the input shaft, wherein the set of transmitting gears comprises at least a driving gear mounted on the control shaft and a driven gear mounted on the input shaft, and when the control shaft rotates, the potentiometer outputs a position signal that corresponds to the rotational position of the control shaft.

4. The valve control device as claimed in claim 3, wherein the housing is provided therein with a middle splint, the potentiometer being fixed on the middle splint, the middle splint being further provided with a driving gear support, the driving gear being located on the driving gear support.

5. The valve control device as claimed in claim 1, wherein an upper end of the control shaft penetrates an upper portion of the housing, and an outer surface of the upper portion of the housing is provided with a dial gauge surrounding the upper end of the control shaft, the upper end of the control shaft being provided with a position pointer which is rotatable synchronously with the control shaft, the position pointer cooperates with the dial gauge and is synchronized with the control shaft and the valve to thereby indicate opening and closing condition of the valve.

6. The valve control device as claimed in claim 1, wherein an upper end of the control shaft penetrates an upper portion of the housing, and a manual knob is provided at the upper end of the control shaft.

7. The valve control device as claimed in claim 1, further comprising an indicating light connected to the control circuit board for indicating adjusting, testing and operating state of the valve.

8. The valve control device as claimed in claim 1, further comprising a buzzer connected to the control circuit board for indicating adjustment, test and operation of the valve.

* * * * *